Nov. 20, 1951  J. B. COOK  2,575,747
APPARATUS FOR MAKING RETRACTILE CORDS
Filed May 6, 1946  2 SHEETS—SHEET 1
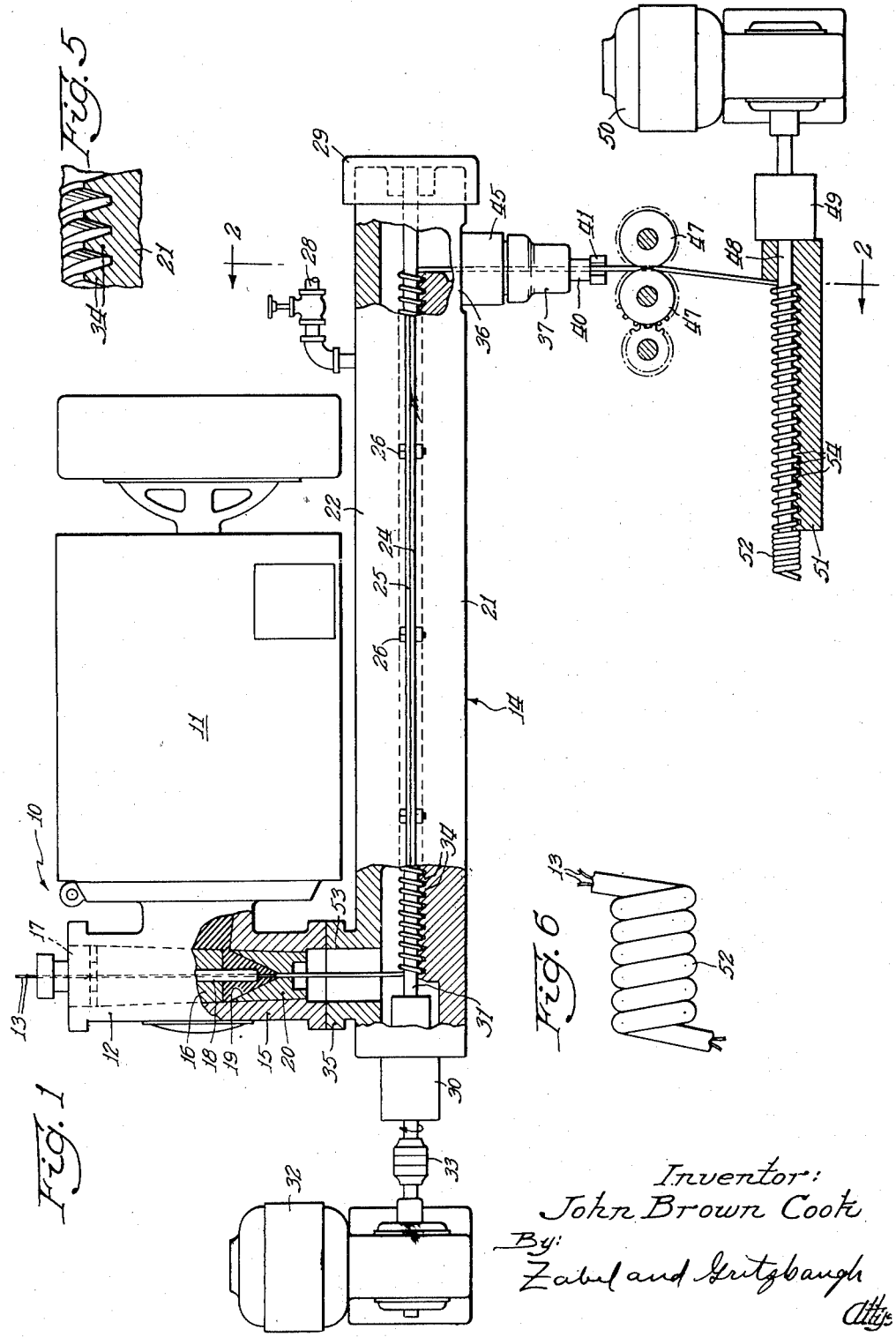
Inventor:
John Brown Cook
By: Zabel and Gritzbaugh
Attys Nov. 20, 1951          J. B. COOK          2,575,747
APPARATUS FOR MAKING RETRACTILE CORDS
Filed May 6, 1946                           2 SHEETS—SHEET 2
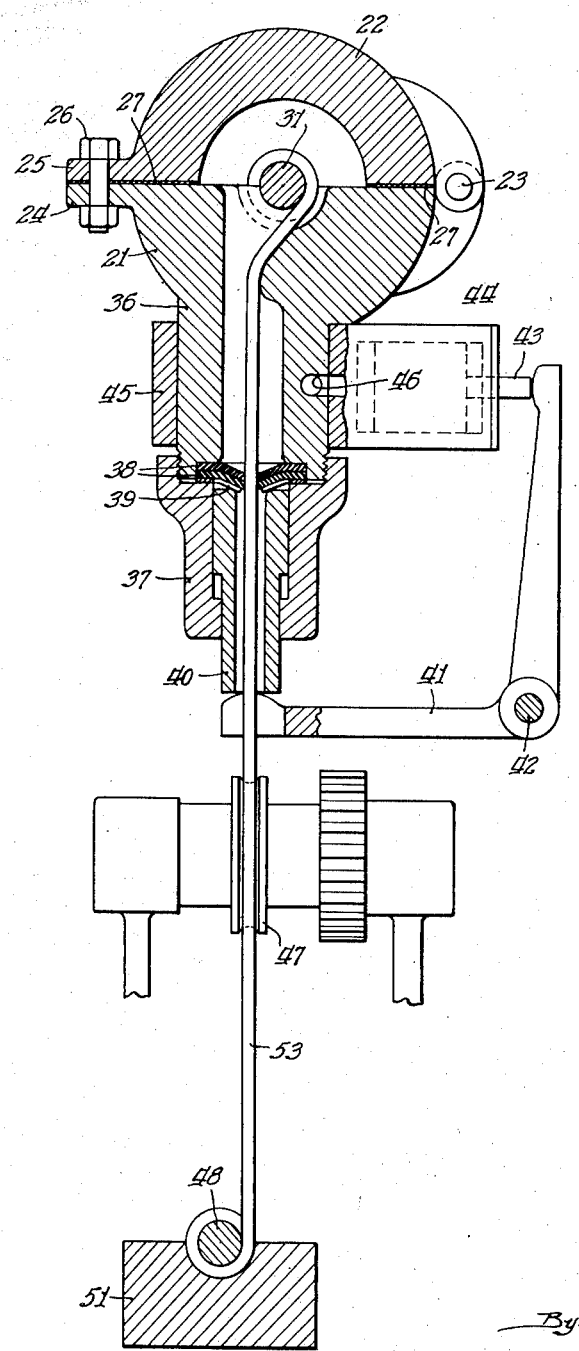
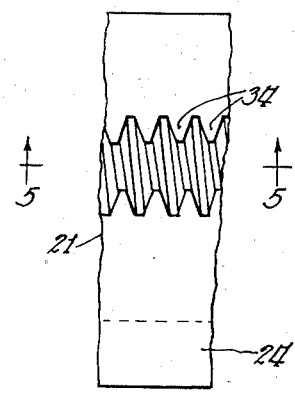
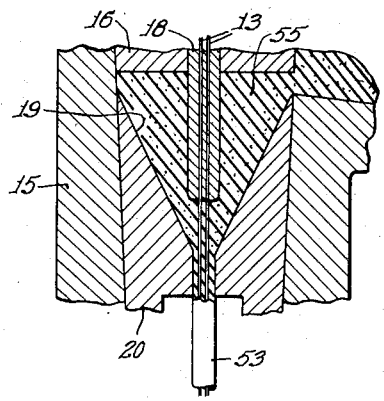
Inventor:
John Brown Cook
By: Zabel and Gritzbaugh
Attys Patented Nov. 20, 1951

2,575,747

UNITED STATES PATENT OFFICE 2,575,747

APPARATUS FOR MAKING RETRACTILE CORDS

John Brown Cook, Chicago, Ill., assignor of one-half to Ralph D. Collins, Beverly Hills, Calif., and one-half to The Whitney Blake Company, Hamden, Conn.

Application May 6, 1946, Serial No. 667,629

5 Claims. (Cl. 18—19)

This invention relates to an improved apparatus for making retractile cords. The term retractile cord is used herein as designating an electrical conductor having a coating or sheathing of rubber or like vulcanizable material, the combination of conductor and coating being formed as a helix, and having sufficient resilience as to permit of a considerable increase in length, as the ends of the helix are pulled apart. Such retractile cords are used in connection with electrical appliances, such as electric irons, and telephones.

Previously, retractile cords have been made by extruding a rubber coating on a conductor, and partially curing the same. This much of the process is continuous. After the rubber has been cured, the coated conductor is cut into suitable lengths. The lengths have then been wound on a mandrel in a helical form and have been given a final cure which causes the rubber to take a helical set. The coated conductor has then been removed from the mandrel, and in this form it comprises a retractile cord.

It is an object of this invention to provide an apparatus for making retractile cords.

In the practice of this invention, the coated conductor is wound on a rotating mandrel as it comes from the extruding device, the mandrel being disposed in a curing chamber. Thus, the curing is effected in a single step, since the coated conductor is wound on the mandrel in the form of a helix and takes a helical set. The arrangement is such that the helical conductor is caused to advance from the inlet end to the outlet end of the curing chamber as it is being cured, and after it is cured, it is continuously withdrawn from the chamber.

Other objects, features and advantages will become apparent as the description proceeds.

With reference now to the drawings, in which like reference numerals designate like parts, Fig. 1 is a plan view, partially in section, of a preferred embodiment of this invention;

Fig. 2 is a section taken along line 2—2 of Fig. 1, showing the outlet of the curing chamber and the outlet seal;

Fig. 3 is an enlarged sectional view of the extruding chamber and extruding die;

Figs. 4 and 5 are enlarged views of a portion of one of the members making up the curing chamber; and Fig. 6 is an enlarged view of the finished product.

With reference to Fig. 1, the extruder is designated generally by the reference numeral 10, and the curing chamber by the reference numeral 14. The extruder may be of the usual type, comprising a reservoir 11, and an extruding head 12. One or more conductors 13, a pair of conductors is herein shown, is fed into the extruding head 12 from a suitable reel and feeding device which is not shown herein. The extruding head comprises a body portion 15 having a tapered passage in which is disposed a core 16. The core may be retained in the body portion by means of a plug 17. At the opposite end of the body portion is a die 20, and the space between the die 20 and the core 16 comprises an extrusion chamber 19. A vulcanizable material such as rubber, is forced by suitable means from the reservoir 11 into the extrusion chamber 19. A tube 18, having a hole for each of the conductors 13, extends through the core 16 and into the extrusion chamber 19.

In operation, as the pair of conductors 13 are fed through the tube 18 into the extrusion chamber 19, and out through the extruding die 20, the vulcanizable material which surrounds the exposed portions of the conductors 13 in the extrusion chamber 19, will be extruded through the die 20, and will thus form a coating on the conductors.

The curing chamber 14 is in direct communication with the extruding head 12, and in the form of a tubular member comprising a front half 21 and a rear half 22. These two halves are hinged to each other by hinges 23, as shown in Fig. 2 and at their opposite sides are provided with flanges 24 and 25, respectively. A plurality of nuts and bolts 26 pass through the flanges and secure the two halves together. Suitable gaskets 27 are provided to prevent the escape of the vulcanizing fluid.

The rear half 22 is provided with a flanged boss 35 which may be bolted or otherwise suitably secured to the body portion 15 of the extruding head 12. Thus, direct communication is provided between the extruding head and the interior of the curing chamber. An inlet 28 for suitably vulcanizing fluid, such as steam, is also provided, this inlet taking into the rear half 22. The arrangement is such that by removal of the bolts 26, the front half 21 may be opened up on the hinges 23 so as to provide access to the interior of the curing chamber. Supporting means, not shown, may be provided for the rear half 22.

The right hand end of the curing chamber may be closed by a cap 29, and the left hand end by a plug 30. A rotatable mandrel 31 is disposed within the curing chamber, and is journaled in the cap 29 and the plug 30. The mandrel is driven by a motor 32 through a coupling 33. The front half 21 of the curing chamber is formed with suitable screw threads 34, such as an acme thread, this thread being cut in the semi-cylindrical interior surface of the front half. Thus, each thread extends only through 180 degrees, more or less.

In operation, as the coated conductor 53 passes through the die 20, it is wound up on the mandrel 31 in the form of a helix by the rotation of the mandrel. The various half threads 34 engage the various convolutions of the helix and serve to advance the convolutions in an axial direction with respect to the mandrel. In other words, the threads 34 cause the helix to be continuously slipped along the mandrel from one end to the other. In order to facilitate this slippage the mandrel 31, and those portions of the screw threads 34 which contact the coated conductor 53, are ground and polished, or may even be plated. As the separate convolutions of the helix advance toward the right hand end of the chamber 14, as shown in Fig. 1, the cure becomes more and more complete, until, at the time at which the convolutions arrive at the outlet end of the curing chamber, they are completely cured, and the rubber has taken a helical set.

At the outlet end of the curing chamber, the front half 21 is provided with an outlet boss 36, which is shown in Fig. 2. Threaded to the outlet boss is a nipple 37, and confined between the adjoining surfaces of the two, are a plurality of flexible sealing disks 38 and 39. The sealing disks 38 may be of rubber, and the sealing disks 39 of spring steel. The coated conductor 53 passes from the mandrel 31, through the outlet boss 36, the sealing disks 38 and 39, and the nipple 37. In order to prevent the loss of steam, a tubular retaining member 40, through which the coated conductor 53 also passes, extends into the nipple and bears against the sealing disk 39. Thus, when the tubular retaining member 40 is urged inwardly it will serve to compress the flexible disks 38 against the coated conductor 53.

Suitable means are provided to urge the tubular retaining member inwardly, these means comprising a bell crank 41 which is pivotally mounted on a suitable shaft 42, one end of the bell crank engaging the outer end of the tubular member 40, and the other end being engaged by a piston rod 43. The piston rod projects from a cylinder 44 which is suitably mounted by means of a bracket or collar 45 to the outlet boss 36. A passageway 46 is provided to supply steam to the interior of cylinder 44 in order to regulate the pressure of the bell crank of the tubular retaining member, and the pressure of the latter against the sealing disks. The steam supplied to the cylinder 44 is preferably supplied from a source which is capable of regulation independently of the pressure of the steam within the curing chamber, in order that the seal may be regulated to best advantage.

After the coated conductor 53 passes through the outlet seal, it passes between a pair of drive pulleys 47, and thence to a mandrel 48. The mandrel 48 is in the form of a stub shaft mounted in a bearing 49 and driven by a motor 50. The mandrel 48 rests in a guide block 51 which is provided with a plurality of half threads 54, similar to the half threads 34, except that they are pitched in the reverse direction. Thus, the coated conductor 53 is wound on to the mandrel 48 in helical form, but the direction of the pitch is opposite to the direction of the pitch of the helix in which the rubber has been cured. Thus, the resilience of the rubber causes the several convolutions to hug each other as soon as they drop off of the mandrel 48 and the guide block 51. This is the final form of the retractile cord, and it is shown in detail in Fig. 6, and is designated by the reference numeral 52.

After the retractile cord 52 has dropped off of the mandrel 48, it may be either cut up into suitable lengths, or it may be wound on a capstan and stored until such time as it is desired to cut it.

The method of making the retractile cord, and the operation of the device has been described in detail in connection with the description of the separate parts. In résumé, it will be seen that the conductors 13 are fed into the extruding head 12, and vulcanizable material 55, such as rubber, is extruded around the conductors to produce a coated conductor 53. This conductor is then wound directly upon a cylindrical mandrel 31, and is caused to advance by means of the half threads 34 through the vulcanizing chamber 14. During its advance, the coated conductor 53 takes a helical set, so that at the time that it passes through the outlet boss 36, it is completely cured. Then, by winding the coated conductor 53 on the mandrel 48 with its pitch reversed, the desired retractile cord 52 is produced.

It will be noted that as the coated conductor 53 emerges from the extruding die 20, a moderate tension is maintained thereon by reason of the fact that it is being wound up on the mandrel 31. Similarly, as the coated conductor passes through the outlet boss 36, and the sealing disks 38 and 39, a sufficient tension is maintained upon it by means of the drive pulleys 47 to cause it to be uncoiled, and to pass through those parts in a reasonably straight path. Similarly, sufficient tension is placed on the coated conductor by means of its engagement with the mandrel 48 so as to cause it to pass in a reasonably straight path from the drive pulleys 47 to the mandrel without buckling and without twisting. It is preferable that the speed of the mandrel be independently adjustable with respect to the speed of the drive pulleys 47, and that the speed of the latter be independently adjustable with respect to the speed of the mandrel 31.

Although only a preferred embodiment of this invention has been shown and described herein, it will be understood that various modifications and changes may be made without departing from the spirit of the invention as defined in the appended claims.

I claim:

1. In an apparatus for making retractile cords, a vulcanizing chamber comprising a tubular member having a substantially radially disposed inlet at one end and a substantially radially disposed outlet at the other end, a cylindrical mandrel journaled in said tubular member, means to rotate said mandrel, and means projecting from the wall of said tubular member into proximity to the surface of said mandrel, said means being so shaped that when a coated conductor is wound up on said mandrel in helical form at the inlet end of said tubular member, and unwound from said mandrel at the outlet end thereof, said projecting means will engage the separate convolutions of said coated conductor and cause the same to advance in an axial direction from the inlet end to the outlet end of said tubular member, and means disposed exteriorly of said chamber and substantially aligned with said outlet for engaging said coated conductor to cause the same to be tensioned whereby the convolutions of said conductor when in helical form will be caused to closely conform to and frictionally engage said mandrel.

2. In an apparatus for making retractile cords, a vulcanizing chamber comprising a tubular member sealed at the ends and having a substantially radially disposed inlet at one end and a substantially radially disposed outlet at the other end, a mandrel journaled in said tubular member, means to rotate said mandrel, means operative when a coated conductor is wound up in helical form on said mandrel at the inlet end of said tubular member and unwound from said mandrel at the outlet end thereon, to cause the helix to advance in an axial direction from the inlet end to the outlet end of said tubular member, means for supplying a vulcanizing fluid to the interior of said tubular member, and means disposed exteriorly of said chamber and substantially aligned with said outlet for engaging said coated conductor to cause the same to be tensioned whereby the convolutions of said conductor when in helical form will be caused to closely conform to and frictionally engage said mandrel.

3. In an apparatus for making retractile cords, a tubular vulcanizing chamber comprising a tubular member having a substantially radially disposed inlet at one end and a substantially radially disposed outlet at the other end, a cylindrical mandrel journaled in said tubular chamber, means to rotate said mandrel, means projecting from the wall of said tubular chamber into proximity to the surface of said mandrel, said means being so shaped that when a coated conductor is wound up in helical form on said mandrel at the inlet end of said tubular chamber and removed from said mandrel at the outlet end thereof, said projecting means will engage the separate convolutions of said helix and cause the same to advance in an axial direction from the inlet end to the outlet end of said tubular chamber, and means for supplying a vulcanizing fluid to the interior of said tubular member, and means disposed exteriorly of said chamber and substantially aligned with said outlet for engaging said coated conductor to cause the same to be tensioned whereby the convolutions of said conductor when in helical form will be caused to closely conform to and frictionally engage said mandrel.

4. In a vulcanizing apparatus for the manufacture of a retractile cord a sealed chamber, a rotatable mandrel journaled in said chamber, means to guide a coated conductor on to said mandrel whereby it will be wound up in helical form, conductor engaging and tensioning means to unwind said coated conductor from said mandrel and to cause it to pass through the wall of said chamber in a substantially radial direction, and means for engaging the separate convolutions of said coated conductor to cause said convolutions to advance from one end of said chamber to the other.

5. In a vulcanizing apparatus for the manufacture of a retractile cord a sealed chamber, means for supplying a vulcanizing fluid to the interior of said sealed chamber, a rotatable mandrel journaled in said chamber, and a partial screw thread extending from a portion of the interior wall surface of said chamber into proximity to said mandrel, the space between the remaining portion of the interior wall surface of said chamber and said mandrel being unobstructed to permit free circulation of said vulcanizing fluid.

JOHN BROWN COOK.

REFERENCES CITED

The following references are of record in the file of this patent:

UNITED STATES PATENTS

| Number | Name | Date |
| --- | --- | --- |
| 2,173,096 | Campbell | Sept. 19, 1939 |
| 2,291,344 | Powell | July 28, 1942 |
| 2,339,683 | Cox | Jan. 18, 1944 |
| 2,363,826 | Yellin | Nov. 28, 1944 |
| 2,365,952 | Hanson | Dec. 26, 1944 |
| 2,393,058 | Pierce et al. | Jan. 15, 1946 |
| 2,525,285 | Collins | Oct. 10, 1950 |